United States Patent
Augustin et al.

(10) Patent No.: US 12,445,067 B2
(45) Date of Patent: Oct. 14, 2025

(54) ELECTRIC DRIVE UNIT FOR AN ELECTRIC HANDHELD POWER TOOL AND ELECTRIC HANDHELD POWER TOOL HAVING AN ELECTRIC DRIVE UNIT

(71) Applicant: Hilti Aktiengesellschaft, Schaan (LI)

(72) Inventors: Christian Augustin, Poettmes (DE); Xiaodong Zhang, Munich (DE); Walter Wissmach, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 166 days.

(21) Appl. No.: 18/555,783

(22) PCT Filed: May 5, 2022

(86) PCT No.: PCT/EP2022/062221
§ 371 (c)(1),
(2) Date: Oct. 17, 2023

(87) PCT Pub. No.: WO2022/243059
PCT Pub. Date: Nov. 24, 2022

(65) Prior Publication Data
US 2024/0213893 A1 Jun. 27, 2024

(30) Foreign Application Priority Data
May 17, 2021 (EP) ..................................... 21174116

(51) Int. Cl.
*H02P 3/18* (2006.01)
*H02P 3/10* (2006.01)
(Continued)

(52) U.S. Cl.
CPC .................. *H02P 3/10* (2013.01); *H02P 3/12* (2013.01); *H02P 7/04* (2016.02); *B25F 5/00* (2013.01)

(58) Field of Classification Search
CPC ...... H02P 3/10; H02P 3/12; H02P 7/04; B25F 5/00
See application file for complete search history.

(56) References Cited

U.S. PATENT DOCUMENTS 5,648,706 A 7/1997 Polk et al.
5,789,885 A 8/1998 See et al.
(Continued)

FOREIGN PATENT DOCUMENTS

DE 4333294 A1 4/1995
DE 19604439 A1 4/1997
(Continued)

OTHER PUBLICATIONS

International Search Report of PCT/EP2022/062221 dated Sep. 16, 2022.
(Continued)

*Primary Examiner* — Muhammad S Islam
(74) *Attorney, Agent, or Firm* — Davidson Kappel LLC

(57) ABSTRACT

An electric drive unit for an electric handheld power tool, having an electric motor with a stator winding and a rotor winding, an actuating circuit for actuating the electric motor and a connection unit for coupling an energy source for driving the electric motor, wherein the stator winding is connected via a first node to a stator-side first half-bridge including a first semiconductor component and a second semiconductor component and is connected via a second node to the rotor winding, wherein the rotor winding is connected to a third node which is connected via a conductive component to the connection unit, and wherein the actuating circuit includes a third semiconductor component which is connected via the second node to the rotor winding and the stator winding and which is connected via a fourth node directly to the connection unit.

15 Claims, 8 Drawing Sheets

(51) Int. Cl.
   *H02P 3/12*   (2006.01)
   *H02P 7/03*   (2016.01)
   *B25F 5/00*   (2006.01)

(56)              References Cited

U.S. PATENT DOCUMENTS

| | | | | |
|---|---|---|---|---|
| 10,418,919 | B2 * | 9/2019 | Lo | B25F 5/00 |
| 2009/0309523 | A1 * | 12/2009 | Ikei | H02P 3/12 |
| | | | | 318/380 |
| 2017/0288580 | A1 * | 10/2017 | Ma | H02P 6/24 |
| 2017/0288583 | A1 * | 10/2017 | Ma | H02P 27/08 |
| 2017/0288584 | A1 * | 10/2017 | Ma | H02P 6/085 |
| 2018/0041062 | A1 * | 2/2018 | Ziegler | B25F 5/00 |

FOREIGN PATENT DOCUMENTS

| | | |
|---|---|---|
| DE | 102013209713 A1 | 11/2014 |
| EP | 3020511 A1 | 5/2016 |
| WO | WO 2022243058 A1 | 5/2022 |
| WO | WO 2022243059 A1 | 5/2022 |

OTHER PUBLICATIONS

International Search Report of PCT/EP2022/062219 dated Sep. 16, 2022.

* cited by examiner

ELECTRIC DRIVE UNIT FOR AN ELECTRIC HANDHELD POWER TOOL AND ELECTRIC HANDHELD POWER TOOL HAVING AN ELECTRIC DRIVE UNIT

FIELD OF THE INVENTION

The present invention relates to an electric drive unit for an electric handheld power tool and to an electric handheld power tool having an electric drive unit.

BACKGROUND

A drilling tool of an electric handheld power tool, such as a drill, can become wedged in a substrate when drilling into it. In order to prevent the drill from rotating about its own axis when it is wedged and to prevent an operator of the drill from possibly being injured, a mechanical protective device in the form of a slip clutch is usually installed in the drill. Said slip clutch disconnects the drive from the drilling tool, the power supply to the electric motor is switched off and the electric motor runs down without endangering the operator.

SUMMARY OF THE INVENTION

If the intention is for an electronic protective device to take over this function, high braking currents are required in order to carry out this process in a few milliseconds to ensure the safety of the operator.

In order to generate a high braking current using an electronic circuit, the polarity of the voltage at the rotor winding is reversed in electric motors, for example. In an electric motor, the polarity reversal is usually carried out using a bridge circuit with TRIACs (bidirectional thyristor triodes) which is operated with an AC voltage. With this use of TRIACs, the polarity reversal can only take place during a zero crossing of the alternating current since TRIACs can only then change their state, in particular switch off. This can result in a time delay of up to 10 ms (with a period duration of a mains half-wave of 50 Hz) during the braking process. In order to still stop the motor within a predetermined period of time, the braking current has to be increased in this case. However, in the case of brush-operated electric motors, this leads to significantly higher carbon brush wear. In addition, when using TRIACs, the currents occurring in the electric motor cannot be regulated when reversing the polarity of the rotor voltage.

Against this background, one object of the present invention is to propose an improved drive unit for an electric handheld power tool.

A first aspect proposes an electric drive unit for an electric handheld power tool. The electric drive unit comprises an electric motor having a stator winding and a rotor winding, an actuating circuit for actuating the electric motor and a connection unit for coupling an energy source for driving the electric motor. The stator winding is connected via a first node to a stator-side first half-bridge comprising a first semiconductor component and a second semiconductor component and is connected via a second node to the rotor winding. The rotor winding is connected to a third node which is connected via a conductive component to the connection unit. The actuating circuit comprises a third semiconductor component which is connected via the second node to the rotor winding and the stator winding and which is connected via a fourth node directly to the connection unit.

The respective semiconductor components can advantageously be actuated by means of the actuating circuit of the electric drive unit in such a way that the rotor current and the stator current of the electric motor can be set precisely and independently of one another during a braking process of the electric motor.

As a result, the rotor current can advantageously be limited to a predetermined current level and the stator current can be regulated independently of this, so that it is possible to brake the electric motor within a prespecified time period, but with a high braking torque, in a way that protects the carbon brushes. At the same time, due to the limited rotor current and the adjustable stator current, brush sparking and heating of the electric motor can be reduced. As a result, carbon brush wear of the electric motor can be reduced. This leads to longer maintenance intervals for the electric motor and thus to an increased service life of the electric motor of the electric handheld power tool.

A further advantage of the electric drive unit is that the actuating circuit of the electric drive unit has a small number of semiconductor components, in particular compared to conventional drive units. As a result, the outlay on manufacture can be reduced, while the fail-safety of the electric drive unit is increased due to the small number of semiconductor components.

When the respective semiconductor component is moved to a conductive state, a current can flow through the semiconductor component. When the respective semiconductor component is moved to a non-conductive state, no current can flow through the semiconductor component.

The electric motor comprises an electric motor with brushes, preferably a universal motor or an all-current motor.

The electric motor comprises, in particular, a stator having at least the stator winding and a rotor having at least the rotor winding. The stator winding can be referred to as a field winding of the electric motor, while the rotor winding can be referred to as an armature winding of the electric motor. In particular, the stator winding has a non-reactive resistance and an inductance, and the rotor winding likewise has a non-reactive resistance and an inductance. The respective non-reactive resistance is preferably as small as possible. When a voltage is applied to the stator winding or to the rotor winding, a current flows through the respective winding. Due to the current and the inductance, a respective magnetic field builds up. The rotor is driven or braked depending on the phase relationship between the stator and the rotor and the direction of the current flow (and therefore the direction of the magnetic field) and the respective direction of rotation of the motor. Since the rotor moves in the magnetic field of the stator, a voltage is induced in the rotor winding according to Lenz's law, as a result of which a current which counteracts the cause (change in the magnetic flux) can flow. This means that the current induced in this way for its part results in a magnetic field which opposes the magnetic field of the stator. By controlling the flow of current in the stator and in the rotor, it is therefore possible to switch over between driving the electric motor and braking the electric motor.

According to one embodiment of the electric drive unit, the actuating circuit further comprises a further semiconductor component which is connected via the second node to the rotor winding and the stator winding and is connected via a fifth node directly to the connection unit.

The fifth node particularly differs from the fourth node. For example, the fifth node is connected to a first rail of the connection unit, which first rail can be connected to a first pole of the energy source, and the fourth node is connected to a second rail of the connection unit, which second rail can be connected to a second pole of the energy source.

The second semiconductor component and/or the further semiconductor component are/is preferably in the form of a passive component, such as a diode. This simplifies the design of the actuating circuit and reduces the manufacturing complexity compared to an active component, such as a bipolar transistor or a MOSFET. Furthermore, the third semiconductor component can be in the form of a thyristor. This likewise reduces the manufacturing complexity.

According to a further embodiment of the electric drive unit, the actuating circuit is designed to move the first semiconductor component to a non-conductive state in order to interrupt a supply current flow.

In particular, the supply current flow is a current flow which is generated by the energy source and can flow through the electric drive unit via the connection unit. In particular, it flows from a first pole of the energy source to the respective semiconductor component and through the respective semiconductor component, such as the first semiconductor component for example, in the direction of a second pole of the energy source.

In this embodiment, the supply current flow is preferably not interrupted within the scope of actuating the first semiconductor component with a PWM signal, as is used during motor operation for example. The period of time during which the supply current flow is interrupted is, in particular, several times greater than a period duration of the PWM signal.

The period duration of the PWM signal comprises at least one pulse (high level) and one zero pulse (low level). The duty cycle preferably indicates the ratio of the pulse duration or the pulse of the PWM signal to the period duration of the PWM signal. For example, the pulse duration (high level) with a duty cycle of 0.5 is 50% of the period duration. The remaining 50% of the period duration comprises the zero pulse (low level). That is to say, with a PWM signal which has a duty cycle of 0.5 and a period duration of 100 µs, the PWM signal outputs a pulse or a high level for a period of time of 50 us and outputs a zero pulse or a low level for a period of time of 50 µs.

A control connection of the respective semiconductor component, such as for example the first semiconductor component, is actuated in particular by means of the high level of the PWM signal or the low level of the PWM signal. If, for example, the respective semiconductor component is a bipolar transistor, the control connection is in the form of a base connection. As an alternative, if the respective semiconductor component is in the form of a MOSFET or an IGBT, the control connection is in the form of a gate connection.

If, in particular, a high level is applied to the control connection of the respective semiconductor component, the respective semiconductor component is moved to a conductive state. If, on the other hand, a low level is applied to the control connection of the respective semiconductor component, the respective semiconductor component is moved to a non-conductive state. It should be noted that reverse logic can also be used, where the roles of the high level and the low level are reversed.

By moving the first semiconductor component to the non-conductive state, the electric motor is preferably switched over from motor operation to braking operation. Before the supply current flow is interrupted, the electric motor is operated, in particular, for motor operation. During motor operation, a work process, such as drilling into a substrate or a chiseling process, is preferably carried out by an operator of the electric handheld power tool. During braking operation, in particular the electric motor, and thus also a tool driven by it, is brought to a standstill. In the context of this patent application, the term "braking operation" is intended to be understood to mean that the electric motor is not in motor operation. Braking operation can also include time intervals in which the electric motor is not braked with a braking torque and can include time intervals in which a current flow through the electric motor has a driving effect. In particular, this can be the case for a short time interval directly after switching over from motor operation to braking operation.

One advantage of the electric drive unit is that the actuating circuit is designed to move the respective semiconductor components to a conductive state or to a non-conductive state at any time during motor operation and/or during braking operation Therefore, braking operation can be immediately initiated during motor operation in the event of wedging of the drilling tool. This increases the safety for an operator of the electric handheld power tool.

The actuating circuit is preferably designed, in particular, to detect a predetermined operating state of the electric handheld power tool during motor operation of the electric motor. The predetermined operating state preferably comprises at least one operation interruption state, in particular wedging of a drilling tool of the electric handheld power tool. If, for example, the drilling tool becomes wedged in a substrate, such as a reinforcement in a reinforced concrete block, during a drilling process using the electric handheld power tool, this is detected as an operation interruption state. The presence of the predetermined operating state is detected, for example, by means of a sensor, in particular by means of a gyro sensor, of the electric handheld power tool.

According to a further embodiment of the electric drive unit, the actuating circuit is designed to move the third semiconductor component to a conductive state in order to connect the rotor winding in parallel with the stator winding.

According to a further embodiment of the electric drive unit, the actuating circuit is designed to move the first semiconductor component to a conductive state in addition to the third semiconductor component in order to provide a magnetic flux, so that a voltage is induced at the rotor winding in the opposite direction compared to a voltage applied to the rotor winding during motor operation of the electric motor.

In particular, the magnetic flux is generated by the current through the stator winding. The magnetic flux is provided in particular in such a way that the rotating rotor moves in the magnetic flux. The magnetic flux can also be referred to as the magnetic field of the stator winding, which is caused by the flow of the stator current through the stator winding.

The voltage induced at the rotor winding is caused in particular by a current induced according to Lenz's law in the rotor winding. Since this flow of current is directed in such a way that the magnetic field caused by it counteracts its cause, a braking torque is produced, which counteracts the rotation of the rotor. The electric motor, in particular its rotor, is thus braked.

The actuating circuit is designed, in particular, to move the first semiconductor component and the third semiconductor component to a conductive state as soon as the rotor current reaches or falls below a predetermined switching threshold value. The predetermined switching threshold value is preferably 0 A. When the rotor current has reached the predetermined switching threshold value in particular, the rotor current has decayed completely, and is therefore preferably 0 A.

According to a further embodiment of the electric drive unit, the electric drive unit comprises a first current measuring unit for determining a current rotor current, wherein the actuating circuit is designed to move the first semiconductor component as a function of the determined current rotor current and a predetermined threshold value of the rotor current to a non-conductive state in order to limit the rotor current.

The rotor current is preferably limited as a function of the predetermined threshold value in such a way that the absolute value of the rotor current is less than or equal to the predetermined threshold value, that is to say does not exceed the predetermined threshold value.

According to a further embodiment of the electric drive unit, the conductive component comprises a fourth semiconductor component and the actuating circuit further comprises a fifth semiconductor component which is connected via the third node to the rotor winding and which is connected via a fifth node directly to the connection unit.

The fifth node particularly differs from the fourth node. For example, the fifth node is connected to a first rail of the connection unit, which first rail can be connected to a first pole of the energy source, and the fourth node is connected to a second rail of the connection unit, which second rail can be connected to a second pole of the energy source.

According to one embodiment of the electric drive unit, the first, the second, the third, the fourth and/or the fifth semiconductor component are/is in the form of a bipolar transistor, in particular in the form of an IGBT, or in the form of a MOSFET.

An IGBT is a bipolar transistor with an insulated gate electrode. In particular, a protective diode (freewheeling diode) is arranged in parallel with the respective semiconductor component in the reverse direction with respect to the supply current of the energy source. Freewheeling diodes are preferably used to protect against an overvoltage when switching off an inductive DC voltage load, such as for example an electric motor. If the respective semiconductor component is in the form of a bipolar transistor, the freewheeling diode is connected in parallel with the collector connection and the emitter connection of the bipolar transistor. If, on the other hand, the respective semiconductor component is in the form of a MOSFET, the freewheeling diode is connected in parallel with the drain connection and the source connection of the MOSFET. For example, a respective rotor current or stator current can decay via a respective freewheeling diode.

According to a further embodiment of the electric drive unit, the actuating circuit is designed to move the fourth semiconductor component to a non-conductive state in order to interrupt a rotor current through the rotor winding.

One advantage of the electric drive unit is that the actuating circuit is designed to move the respective semiconductor components to a conductive state or to a non-conductive state at any time during motor operation and/or during braking operation. Therefore, braking operation can be immediately initiated during motor operation in the event of wedging of the drilling tool. This increases the safety for an operator of the electric handheld power tool.

According to a further embodiment of the electric drive unit, the actuating circuit is designed to move the third semiconductor component and the fifth semiconductor component to a conductive state for reversing the polarity of an input voltage applied to the rotor winding compared to motor operation.

The actuating circuit is preferably designed to connect the rotor winding in parallel with the stator winding before the polarity reversal by way of the third semiconductor component being moved to a conductive state. In particular, before the connection in parallel, the stator winding and the rotor winding of the electric motor are interconnected as in a series-wound machine whereas, after the connection in parallel, the stator winding and the rotor winding of the electric motor are interconnected as in a shunt-wound machine.

The polarity reversal of the input voltage at the rotor winding $U_{in}$ is explained in particular below. The following equation (1):

$$i_{Armature} = \frac{1}{L_{Armature}} \int u_{L_{Armature}} \cdot dt, \qquad \text{equation (1)}$$

where $L_{Armature}$ represents the inductance of the rotor winding and $U_{L_{Armature}}$ represents the rotor voltage at the rotor winding, holds true for example approximately for the rotor current through the rotor winding.
Equation (2):

$$u_{L_{Armature}} = U_{in} - U_{R_{Armature}} - U_{IND}, \qquad \text{equation (2)}$$

where $U_{in}$ is the input voltage at the rotor winding, $U_{R_{Armature}}$ is a voltage dropped across the non-reactive resistor of the rotor and $U_{IND}$ is a voltage induced at the rotor winding, holds true for the rotor voltage $u_{L_{Armature}}$ during motor operation before polarity reversal, it being possible for the voltage induced at the rotor winding to be represented by equation (3):

$$U_{IND} = c_A \cdot \Psi_E \cdot \omega, \qquad \text{equation (3)}$$

where $c_A$ represents a machine constant, $\Phi_E$ represents the magnetic excitation flux generated by the stator current through the stator winding and $\omega$ represents the current rotation speed of the rotor.

Due to reversing the polarity of the input voltage at the rotor winding $U_{in}$, this has the same sign as the induced voltage $U_{IND}$, which is why the voltages are now all added up in terms of absolute value. Therefore, equation (4):

$$u_{L_{Armature}} = -U_{in} - U_{R_{Armature}} - U_{IND}, \qquad \text{equation (4)}$$

holds true for the rotor voltage $u_{L_{Armature}}$ during braking operation after the polarity reversal. As a result, a current directed opposite to the stator current through the stator winding is generated in the rotor winding. A magnetic field is therefore generated by the rotor current, which magnetic field interacts with the magnetic field generated by the stator winding in such a way that a braking torque is produced. The rotor is thus braked.

According to a further embodiment of the electric drive unit, the electric drive unit comprises a first current measuring unit for determining a current rotor current, wherein the actuating circuit is designed to move the fourth semiconductor component and the fifth semiconductor component as a function of the determined current rotor current and a predetermined threshold value of the rotor current alternately in synchronism with opposite senses to a conductive state and to a non-conductive state in order to limit the rotor current.

The rotor current is preferably limited as a function of the predetermined threshold value in such a way that the rotor current does not exceed the predetermined threshold value.

The expression "alternately in synchronism with opposite senses" means, in particular, that two semiconductor components, such as the fourth semiconductor component and the fifth semiconductor component, are switched alternately in such a way that, for example, the fourth semiconductor component is in a conductive state while at the same time the fifth semiconductor component is in a non-conductive state, or vice versa.

According to a further embodiment of the electric drive unit, the actuating circuit is designed to move the fourth semiconductor component and the fifth semiconductor component as a function of the determined current rotor current, the predetermined threshold value of the rotor current and a current rotation speed of the electric motor alternately in synchronism with opposite senses to a conductive state and to a non-conductive state in order to limit the rotor current.

Here, the rotor current is likewise preferably limited as a function of the predetermined threshold value in such a way that the rotor current does not exceed the predetermined threshold value.

According to a further embodiment of the electric drive unit, the electric drive unit comprises a second current measuring unit for determining a current stator current, wherein the actuating circuit is designed to move the first semiconductor component alternately to a conductive state and to a non-conductive state in order to regulate a stator current through the stator winding as a function of a current rotation speed of the electric motor.

In this case, the actuating circuit is preferably designed to increase the stator current as the current rotation speed drops. The braking torque can be increased by increasing the stator current.

According to a further embodiment of the electric drive unit, the actuating circuit is designed, after a predetermined period of time has elapsed after the third semiconductor component and the fifth semiconductor component have been moved to a conductive state, to move the first semiconductor component alternately to a conductive state and to a non-conductive state in order to regulate a stator current through the stator winding as a function of a current rotation speed of the electric motor.

In particular, after the polarity reversal, the system waits for the predetermined period of time to elapse. The predetermined period of time is below 5 ms, preferably below 4 ms, preferably below 3 ms, preferably below 2 ms. As soon as the predetermined period of time has elapsed, the stator winding is preferably energized as a function of the state of the first semiconductor component and the stator current can be increased. Therefore, the stator current can be regulated independently of the rotor current. This measure advantageously reduces brush sparking, as a result of which carbon brush wear is reduced.

According to a further embodiment, the electric drive unit is designed for operation from a DC voltage source, a pulsating DC voltage source or an AC voltage source with a rectifier.

The energy source is preferably an AC voltage source with a rectifier, it additionally being possible for a smoothing capacitor to be provided.

According to a further embodiment of the electric drive unit, the actuating circuit comprises a plurality of driver circuits, with each semiconductor component being assigned a driver circuit for outputting a respective control signal for actuating the respective semiconductor component.

This actuation of the semiconductor components by the actuating circuit by means of the respective driver circuit makes it possible for the rotor current and the stator current of the electric motor to be set precisely and independently of one another during a braking process of the electric motor. The respective control signal is, in particular, a PWM (pulse-width-modulation) signal.

A second aspect proposes an electric handheld power tool having an electric drive unit according to the first aspect.

The electric handheld power tool is, for example, in the form of a drill, a hammer drill, a saw, a mixer, a grinder, a cut-off grinder or the like. The electric handheld power tool can be operated in particular using a cable. As an alternative, the electric handheld power tool can have a receiving bay for receiving a rechargeable battery which supplies said electric handheld power tool with energy.

BRIEF DESCRIPTION OF THE FIGURES

The following description explains the invention with reference to exemplary embodiments and figures, in which.

Identical or functionally identical elements are indicated by the same reference signs in the figures, unless stated otherwise.

DETAILED DESCRIPTION

Figure 1:
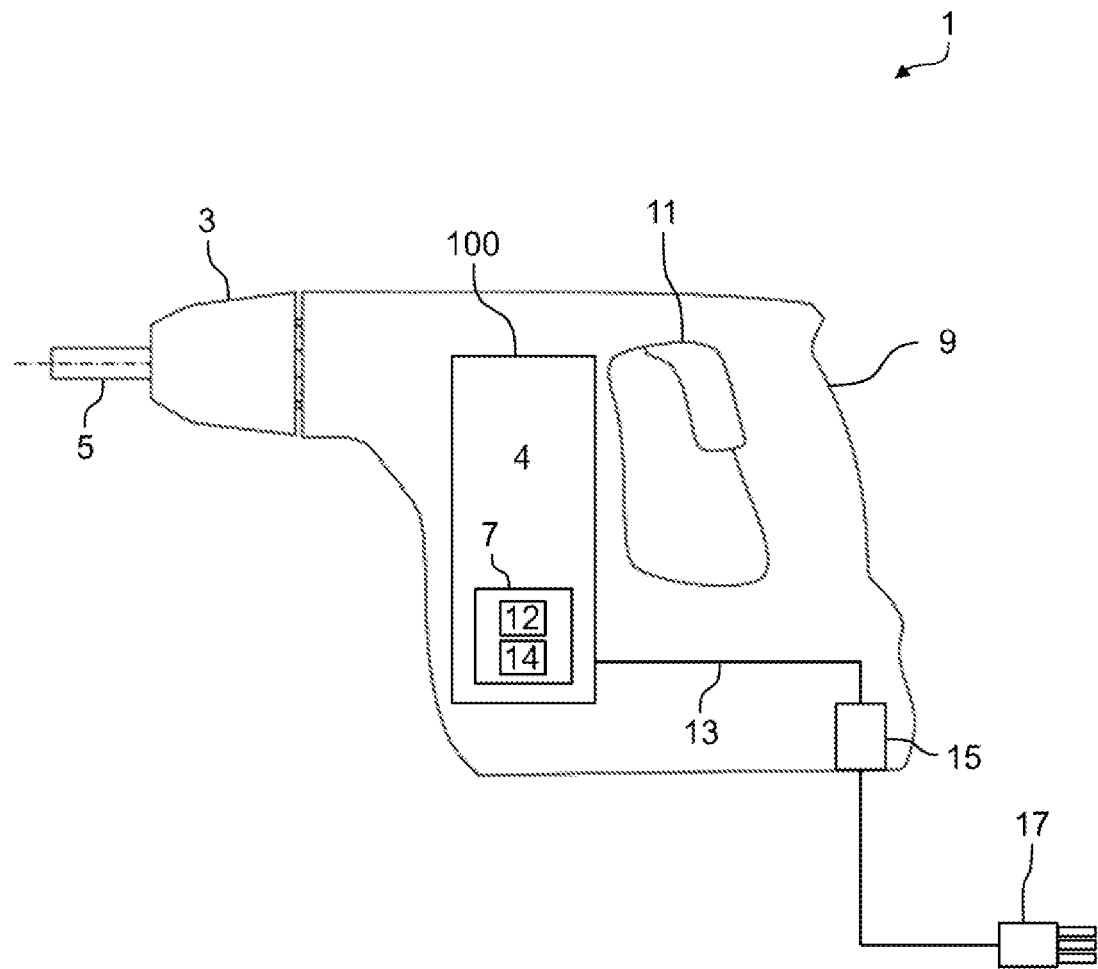
FIG. 1 shows a schematic view of an electric handheld power tool.

FIG. 1 shows a schematic view of an electric handheld power tool 1 which is in the form of a drill by way of example. The drill 1 has a tool fitting 3 in which a drill bit is inserted as a drilling tool 5. A primary drive of the drill 1 is an electric motor 7 having a stator winding 12 and a rotor winding 14. An operator can guide the drill 1 by means of a handle 9 and put it into operation by means of a button 11. During operation, the drill 1 rotates the drill bit 5 continuously about a working axis and in so doing can drill the drill bit 5 along the working axis into a substrate.

The drill 1 has an electric drive unit 100 in FIG. 1. The electric drive unit 100 comprises the electric motor 7 and an actuating circuit 4 for actuating the electric motor 7. The electric drive unit 100 is coupled via an electrical line arrangement 13 to a connection terminal 15 which can be coupled to a power grid by means of a plug 17. As an alternative, the drill 1 can also be supplied with power via a rechargeable battery. The drive train includes, for example, a drive shaft and a transmission between the electric motor 7 and the drive shaft. The transmission can adapt, for example, a rotation speed n(t) (see FIG. 6) of the electric motor 7 to a desired rotation speed of the drill bit 5.

Figure 2A:
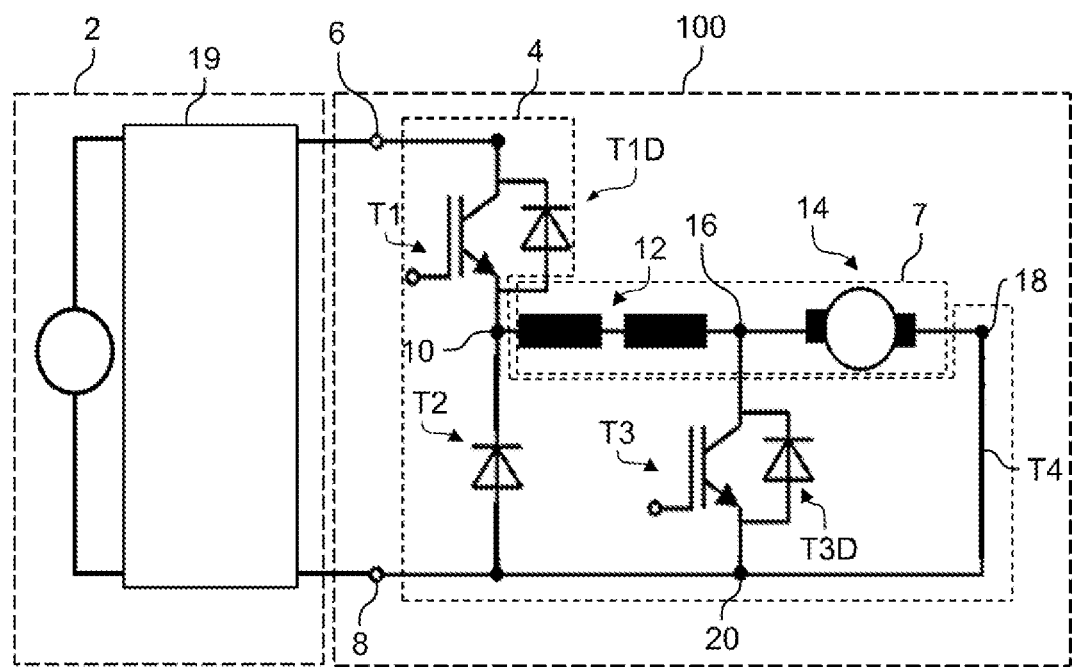
FIG. 2A shows a schematic view of a first embodiment of a circuit topology of an electric drive unit.

FIG. 2A shows a schematic view of a first specific embodiment of a circuit topology of an electric drive unit 100 which can be used, for example, in the electric handheld power tool 1 according to FIG. 1.

The electric drive unit 100 of FIG. 2A has an electric motor 7 which comprises a stator winding 12 and a rotor winding 14. The electric drive unit 100 further has an actuating circuit 4 for actuating the electric motor 7. Furthermore, the electric drive unit 100 has a connection unit 6, 8 for coupling an energy source 2 for driving the electric motor 7. In FIG. 2A, the energy source 2 is in the form of an AC voltage source with a rectifier 19 by way of an example. It is likewise possible, in particular, for the energy source 2 to be in the form of a DC voltage source or in the form of a pulsating DC voltage source.

Furthermore, in FIG. 2A, the stator winding 12 is connected via a first node 10 to a stator-side first half-bridge which comprises a first semiconductor component T1 and a second semiconductor component T2. In addition, the stator winding 12 is connected via a second node 16 to the rotor winding 14. The rotor winding 14 is connected to a third node 18 which is connected via a conductive component T4 to a second connection 8 of the connection unit 6, 8. The energy source 2 has, in particular, a first pole, preferably a positive pole, which is connected to a first connection 6 of the connection unit 6, 8. The energy source 2 further comprises a second pole, in particular a negative pole, which is connected to the second connection 8 of the connection unit 6, 8. The actuating circuit 4 comprises a third semiconductor component T3 which is connected via the second node 16 to the rotor winding 14 and the stator winding 12 and which is connected via a fourth node 20 directly to the second connection 8 of the connection unit 6, 8. In addition, the first semiconductor component T1 and the third semiconductor component T3 have a respective freewheeling diode T1D, T3D connected in parallel. In FIG. 2A, the second semiconductor component T2 is in the form of a diode. An anode connection of the diode is connected to the second connection 8 of the connection unit 6, 8. The diode is therefore arranged in particular in the reverse direction with respect to a supply current of the energy source 2. Furthermore, in FIG. 2A, the first semiconductor component T1 and the third semiconductor component T3 are each in the form of an IGBT by way of example.

Figure 2B:
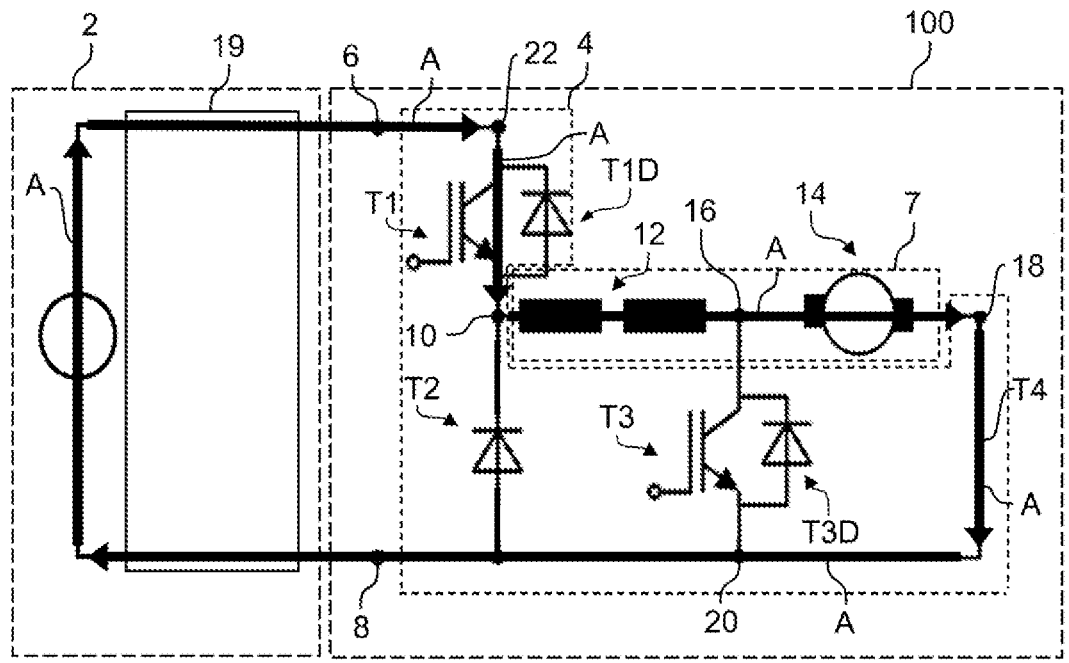
FIG. 2B shows a schematic current flow diagram during motor operation of an electric motor within the circuit topology of the electric drive unit according to FIG. 2A.

FIG. 2B shows a schematic current flow diagram of a supply current which is generated in the energy source 2 during motor operation of an electric motor 7 within the circuit topology of the electric drive unit 100 according to FIG. 2A. During motor operation (drive situation), the conductive component T4 is permanently in a conductive state and the third semiconductor component T3 is permanently in a non-conductive state, so that the stator winding 12 is connected in series with the rotor winding 14. The electric motor 7 is operated as a series-wound machine here. The level of the supply current through the stator winding 12 and the rotor winding 14 and thus also the current rotation speed n(t) (see FIG. 6) of the electric motor 7 are regulated in particular by moving the first semiconductor component T1 alternately to a conductive state and to a non-conductive state.

In FIG. 2B, when the electric motor 7 is being driven, the supply current flows, as shown in FIG. 2B by the arrows A, from the energy source 2 via a first connection 6 of the connection unit 6, 8 and via a fifth node 22 through the first semiconductor component T1, from the first semiconductor component T1 via a first node 10 through the stator winding 12, from the stator winding 12 via a second node 16 through the rotor winding 14 to a third node 18, from the third node 18 through the conductive component T4 via a fourth node 20 and via a second connection 8 of the connection unit 6, 8 back to the energy source 2.

Figure 2C:
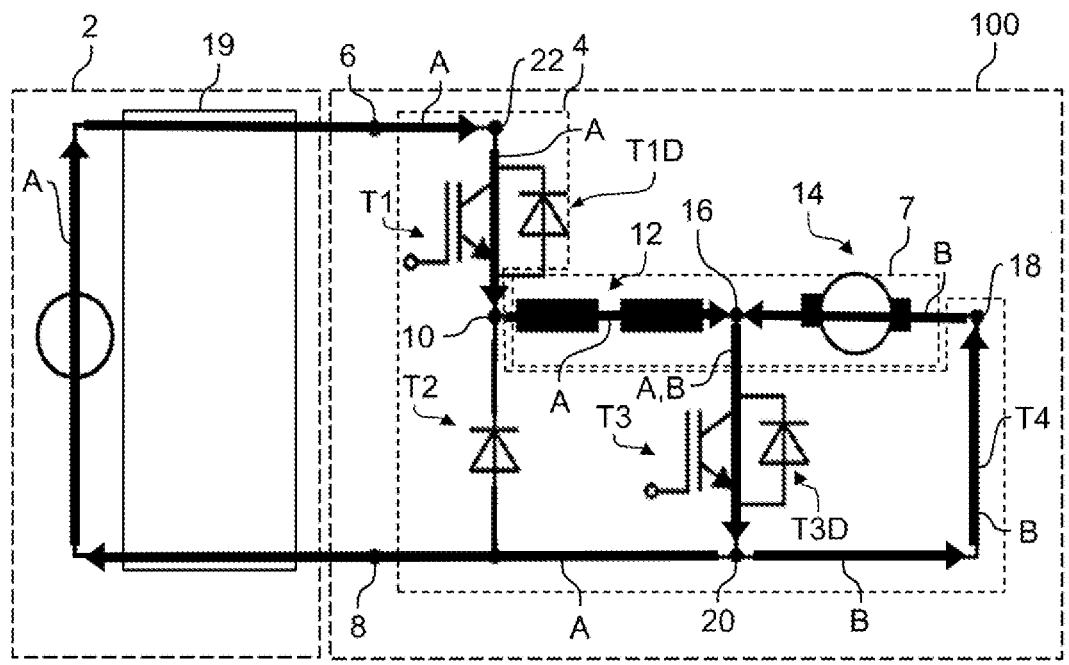
FIG. 2C shows a schematic current flow diagram during braking operation of an electric motor within the circuit topology of the electric drive unit according to FIG. 2A.

FIG. 2C shows a schematic current flow diagram during braking operation of an electric motor 7 within the circuit topology of the electric drive unit 100 according to FIG. 2A. During braking operation, the respective semiconductor components are actuated as follows:

In a first step, the first semiconductor component T1 is moved to a non-conductive state in order to switch the electric motor 7 from motor operation to braking operation. The supply current flow is interrupted by moving the first semiconductor component T1 to a non-conductive state. In a second step, the third semiconductor component T3 is moved to a conductive state in order to connect the rotor winding 14 in parallel with the stator winding 12. In a third step, the first semiconductor component T1 is moved to a conductive state in order to provide a magnetic flux, so that a voltage is induced at the rotor winding 14 in the opposite direction compared to a voltage applied to the rotor winding 14 during motor operation of the electric motor 7. In a fourth step, the first semiconductor component T1 is moved to a non-conductive state as a function of a predetermined threshold value $I_L$ (see FIG. 6) for a rotor current $I_R(t)$ (see FIG. 6) through the rotor winding 14 in order to limit the rotor current $I_R(t)$. The rotor current $I_R(t)$ is preferably limited to a predetermined threshold value. For example, a current measuring unit RCMU is provided for this purpose, which is designed in order to monitor the rotor current $I_R(t)$. In a fifth step, the first semiconductor component T1 is alternately moved to a conductive state and to a non-conductive state in order to regulate a stator current Is(t) (see FIG. 6) through the stator winding 12 as a function of a current rotation speed n(t) (see FIG. 6) of the electric motor 7. The stator current Is(t) is preferably regulated to a rotation speed-dependent value. For example, a further current measuring unit SCMU is provided for this purpose, which is designed in order to monitor the stator current $I_R(t)$. When the rotation speed n(t) of the electric motor 7 has reached a predetermined threshold value, the electric motor 7 is preferably completely disconnected from the energy source 2. This concludes the braking process.

During braking operation, the third semiconductor component T3 in particular is permanently in a conductive state. As a result, the stator winding 12 and the rotor winding 14 are no longer connected in series. The electric motor 7 is therefore operated as a shunt-wound machine and no longer as a series-wound machine (see FIG. 2B). The voltage induced at the rotor winding 14, in particular during braking operation, is preferably caused by a rotor current $I_R(t)$ induced according to Lenz's law in the rotor winding 14. Since this flow of current is directed in such a way that the magnetic field caused by it counteracts its cause, a braking torque is produced, which counteracts the rotation of the rotor. Thus, the electric motor 7 is braked.

During braking operation, a supply current flows, as shown by the arrows A in FIG. 2C, from the energy source 2 via a first connection 6 of the connection unit 6, 8 and via a fifth node 22 through the first semiconductor component T1, from the first semiconductor component T1 via a first node 10 through the stator winding 12, from the stator winding 12 via a second node 16 through the third semiconductor component T3, from the third semiconductor component T3 via a fourth node 20 and via a second connection 8 of the connection unit 6, 8 back to the energy source 2. At the same time, an induced current flows in the rotor winding 14, which induced current is shown by the arrows B in FIG. 2C. The induced current is directed opposite to the supply current. This oppositely directed current flows from the second node 16 through the third semiconductor component T3 to a fourth node 20, from the fourth node 20 through the conductive component T4 to a third node 18, and from the third node 18 through the rotor winding 14 back to the second node 16.

Figure 3A:
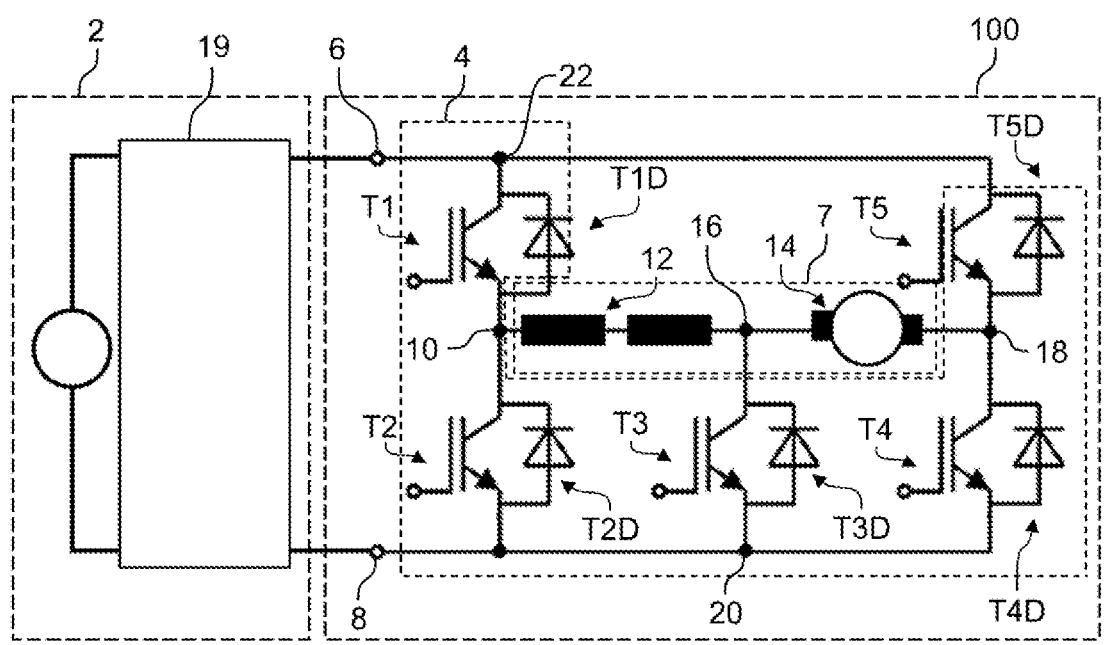
FIG. 3A shows a schematic view of a second embodiment of a circuit topology of an electric drive unit.

FIG. 3A shows a schematic view of a second embodiment of a circuit topology of an electric drive unit 100 which can be used, for example, in the electric handheld power tool 1 according to FIG. 1.

The electric drive unit 100 of FIG. 3A has a similar structure to the electric drive unit 100 of FIG. 2A. Only the differences from the electric drive unit 100 of FIG. 2A are explained below. In addition to FIG. 2A, the electric drive unit 100 of FIG. 3A has a fifth semiconductor component T5. By way of example, said fifth semiconductor component is in the form of an IGBT with a freewheeling diode T5D connected in parallel with it. The fifth semiconductor component T5 is connected via a third node 18 to the rotor winding 14 and is connected via a fifth node 22 directly to a first connection 6 of the connection unit 6, 8. Furthermore, the conductive component T4 in FIG. 3A is in the form of a fourth semiconductor component T4 and likewise, by way of example, in the form of an IGBT with a freewheeling diode T4D connected in parallel with it. The second semiconductor component T2 in FIG. 3 is also in the form of an IGBT with a freewheeling diode T2D connected in parallel with it.

Figure 3B:
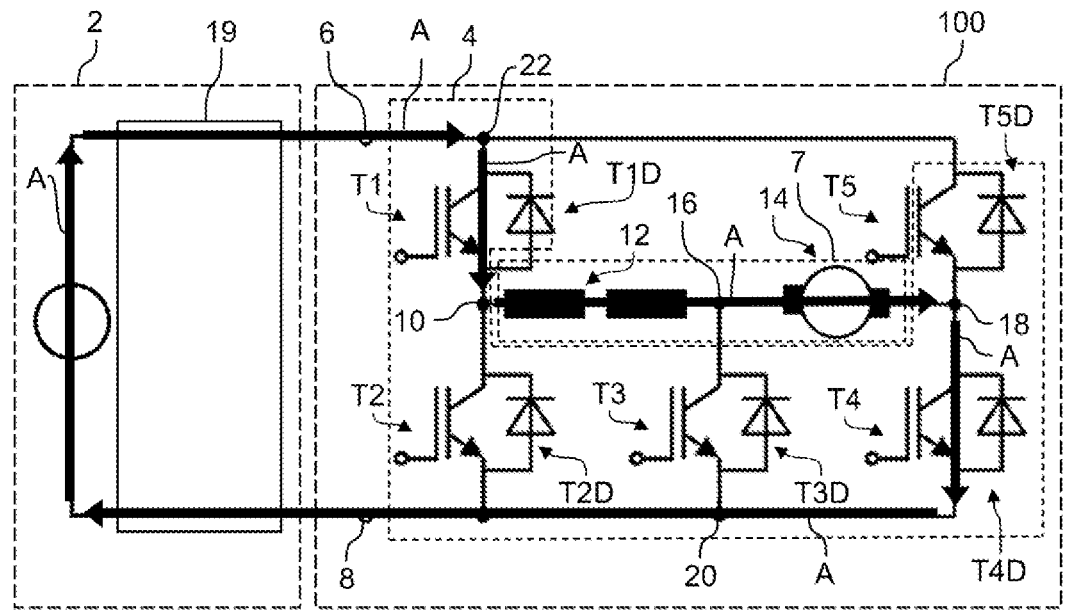
FIG. 3B shows a schematic current flow diagram during motor operation of an electric motor within the circuit topology of the electric drive unit according to FIG. 3A.

FIG. 3B shows a schematic current flow diagram of a supply current during motor operation of an electric motor 7 within the circuit topology of the electric drive unit 100 according to FIG. 3A. The feed current flow during motor operation in FIG. 3B is identical to the feed current flow during motor operation in FIG. 2B, for which reason an explanation is omitted here. It should be noted that the semiconductor component T4 is permanently in a conductive state in this case. Furthermore, the second semiconductor component T2 and the fifth semiconductor component T5 are permanently in a non-conductive state during motor operation.

Figure 3C:
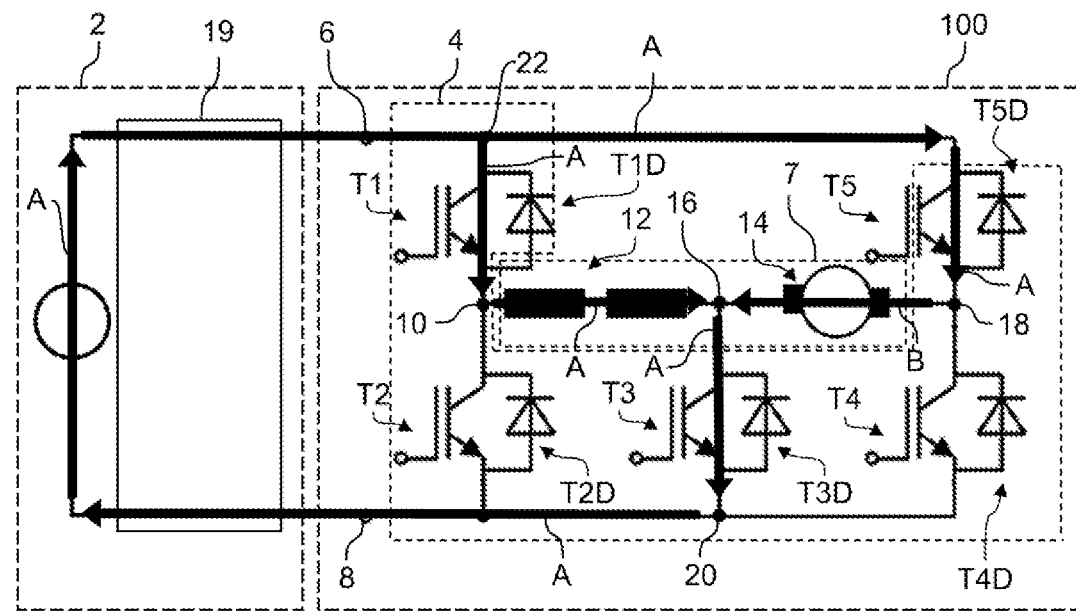
FIG. 3C shows a schematic current flow diagram during braking operation of an electric motor within the circuit topology of the electric drive unit according to FIG. 3A.

FIG. 3C shows a schematic current flow diagram during braking operation of an electric motor 7 within the circuit topology of the electric drive unit 100 according to FIG. 3A. During braking operation, the respective semiconductor components are actuated as follows:

In a first step, the fourth semiconductor component T4 is moved to a non-conductive state in order to switch the electric motor 7 from motor operation to braking operation. In a second step, the third semiconductor component T3 and the fifth semiconductor component T5 are moved to a conductive state in order to reverse the polarity of an input voltage applied to the rotor winding 14 compared to motor operation. In a third step, the fourth semiconductor component T4 and the fifth semiconductor component T5 are moved as a function of a predetermined threshold value $I_L$ (see FIG. 6) for a rotor current $I_R(t)$ (see FIG. 6) through the rotor winding 14 alternately in synchronism with opposite senses to a conductive state and to a non-conductive state in order to limit the rotor current $I_R(t)$. The rotor current $I_R(t)$ is preferably limited to a predetermined threshold value. For example, a current measuring unit (not shown) is provided for this purpose, which is designed in order to monitor the rotor current $I_R(t)$. The fourth semiconductor component T4 and the fifth semiconductor component T5 form, in particular, a rotor-side second half-bridge. In a fourth step, the first semiconductor component T1 is alternately moved to a conductive state and to a non-conductive state in order to regulate a stator current Is(t) (see FIG. 6) through the stator winding 12 as a function of a current rotation speed n(t) (see FIG. 6) of the electric motor 7. The stator current Is(t) is preferably regulated to a rotation speed-dependent value. For example, a further current measuring unit (not shown) is provided for this purpose, which is designed in order to monitor the stator current $I_R(t)$. When the rotation speed n(t) of the electric motor 7 has reached a predetermined threshold value, the electric motor 7 is preferably completely disconnected from the energy source 2. This concludes the braking process.

During braking operation, the third semiconductor component T3 in particular is permanently in a conductive state. As a result, the stator winding 12 and the rotor winding 14 are no longer connected in series. The electric motor 7 is therefore operated as a shunt-wound machine and no longer as a series-wound machine (see FIG. 3B). The stator current Is(t) through the stator winding 12 (as in the drive situation) is regulated in particular by the stator-side first half-bridge comprising the first semiconductor component T1 and the second semiconductor component T2. The rotor current $I_R(t)$ through the rotor winding 14 is regulated by the rotor-side second half-bridge comprising the fourth semiconductor component T4 and the fifth semiconductor component T5. A voltage induced at the rotor winding 14 is preferably caused by a rotor current $I_R(t)$ induced according to Lenz's law during braking operation in the rotor winding 14. The induced rotor current $I_R(t)$ in the rotor winding 14 is caused in particular by the polarity reversal (see above, second step) of the input voltage at the rotor winding 14. Since this flow of current is directed in such a way that the magnetic field caused by it counteracts its cause, a braking torque is produced, which counteracts the rotation of the rotor. Thus, the electric motor 7 is braked.

During braking operation of the electric motor 7, a supply current flows, as shown by the arrows A in FIG. 3C, from the energy source 2 via a first connection 6 of the connection unit 6, 8 and via a fifth node 22 through the first semiconductor component T1, from the first semiconductor component T1 via a first node 10 through the stator winding 12, from the stator winding 12 via a second node 16 through the third semiconductor component T3, from the third semiconductor component T3 via a fourth node 20 and via a second connection 8 of the connection unit 6, 8 back to the energy source 2. In addition, the feed current flows from the energy source 2 via the first connection 6 of the connection unit 6, 8 via the fifth node 22 through the fifth semiconductor component T5 to a third node 18. Due to the polarity reversal of the input voltage (see above, second step) at the rotor winding 14, the supply current now flows through the rotor winding in the opposite direction (compared to motor operation). At the same time, a current is induced in the rotor winding 14, which current flows in the same direction, so that the two currents are added up in terms of absolute value. As shown by arrow B in FIG. 3C, the induced current flows from the third node 18 through the rotor winding 14 to the second node 16.

The following applies in particular to FIGS. 3A-3C: if, for example, the supply current through the stator-side first half-bridge becomes too high, the first semiconductor component T1 is moved to a non-conductive state and the second semiconductor component T2 is moved to a conductive state, so that the supply current can decay across the latter. If, on the other hand, in particular the current through the rotor-side second half-bridge, which current is composed in particular of the supply current and the induced current, becomes too high, the fifth semiconductor component T5 is moved to a non-conductive state and the fourth semiconductor component T4 is moved to a conductive state, so that the current can decay across the latter.

Figure 4:
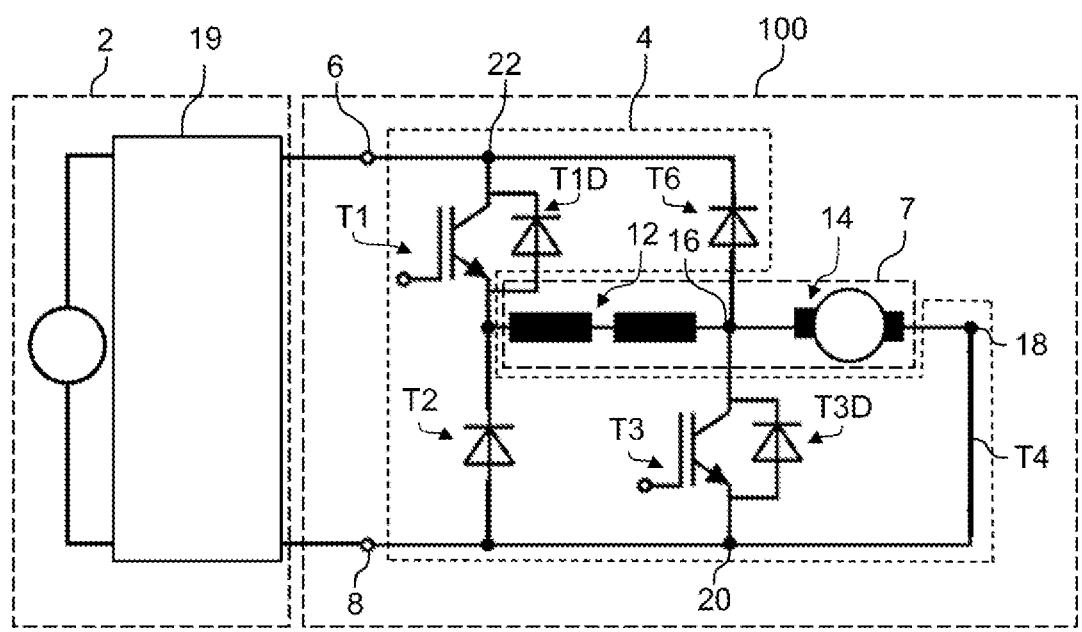
FIG. 4 shows a schematic view of a third embodiment of a circuit topology of an electric drive unit.

FIG. 4 shows a schematic view of a third embodiment of a circuit topology of an electric drive unit 100.

The electric drive unit 100 of FIG. 4 has a similar structure to the electric drive unit 100 of FIG. 2A. Only the differences from the electric drive unit 100 of FIG. 2A are explained below. The actuating circuit 4 of FIG. 4 has a further semiconductor component T6. The further semiconductor component T6 is connected via the second node 16 to the rotor winding 14 and the stator winding 12 and is connected via a fifth node 22 directly to a first connection 6 of the connection unit 6, 8. The further semiconductor component T6 is, in particular, in the form of a diode in FIG. 4. A cathode connection of the diode is connected to the fifth node 22 while an anode connection of the diode is connected to the second node 16. The further semiconductor component T6 in the form of a diode is therefore arranged in particular in the reverse direction with respect to the feed current of the energy source 2. As in FIG. 2A, the second semiconductor component T2 of FIG. 4 is, in particular, in the form of a diode and is interconnected, as explained in FIG. 2A.

Figure 5:
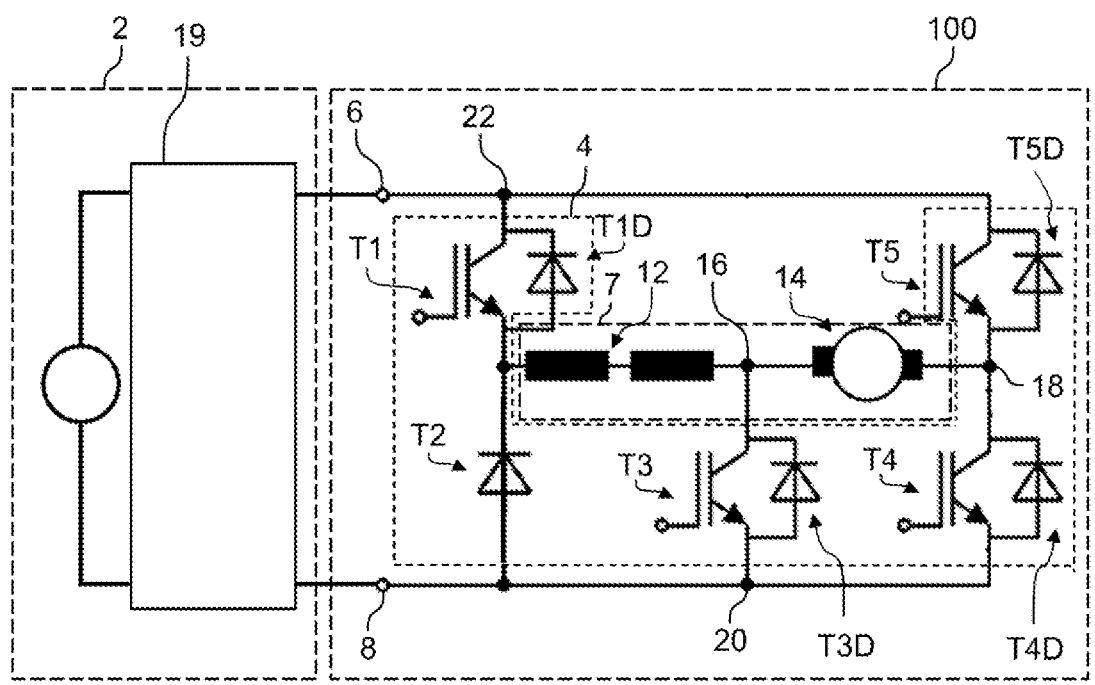
FIG. 5 shows a schematic view of a fourth embodiment of a circuit topology of an electric drive unit.

FIG. 5 shows a schematic view of a fourth embodiment of a circuit topology of an electric drive unit 100.

The electric drive unit 100 of FIG. 5 has a similar structure to the electric drive unit 100 of FIG. 3A. Only the differences from the electric drive unit 100 of FIG. 3A are explained below. As in FIG. 2A, the second semiconductor component T2 of FIG. 5 is, in particular, in the form of a diode and is interconnected, as explained in FIG. 2A.

Figure 6:
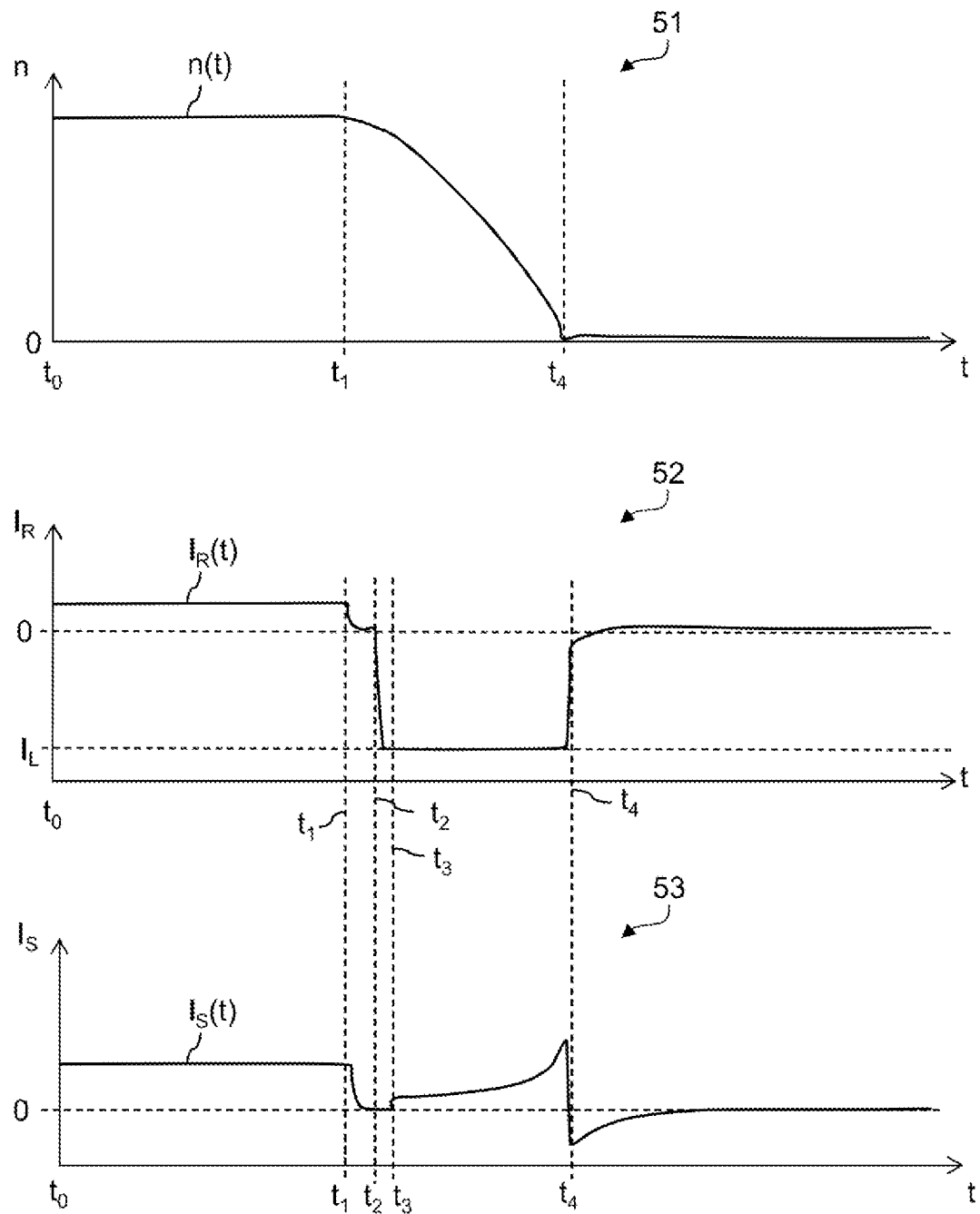
FIG. 6 shows a schematic diagram of a sequence of a control method for braking an electric motor.

FIG. 6 shows a schematic diagram of a sequence of a control method for braking an electric motor 7 (see FIGS. 1, 2A, 2B, 2C, 3A, 3B, 3C, 4, 5), for example an electric motor 7 of the electric handheld power tool 1 according to FIG. 1. The schematic diagram of FIG. 6 comprises three graphs 51, 52 and 53. A first graph 51 shows the profile of the current rotation speed n of the electric motor 7 (vertical axis) as a function of time t (horizontal axis). A second graph 52 shows the profile of the rotor current $I_R$ in the electric motor 7 (vertical axis) as a function of time t (horizontal axis). A third graph 53 shows the profile of the stator current Is in the electric motor 7 (vertical axis) as a function of time t (horizontal axis).

Initially, the electric handheld power tool 1 is in motor operation (time interval between $t_0$ and $t_1$). In particular, a rotor current $I_R(t)$ (see second graph 52, time interval between $t_0$ and $t_1$) flows through a rotor winding 14 (see FIGS. 1, 2A, 2B, 2C, 3A, 3B, 3C, 4, 5) as a function of a target rotation speed of the electric motor 7 and a stator current Is(t) (see third graph 53, time interval between $t_0$ and $t_1$) flows through a stator winding 12 (see FIGS. 1, 2A, 2B, 2C, 3A, 3B, 3C, 4, 5) as a function of the target rotation speed of the electric motor 7.

If, for example, the drilling tool 5 (see FIG. 1) of the electric handheld power tool 1 becomes wedged in a rebar during motor operation when working with the electric handheld power tool 1, this is detected by a sensor, such as a gyro sensor, as an operation interruption state of the electric handheld power tool 1.

The operation interruption state is detected at time $t_1$, in the case of which the electric motor 7 is switched over from motor operation to braking operation. For this purpose, for example, a supply current flow through the stator winding 12 and/or the rotor winding 14 is interrupted. After the switching over, the system waits for the rotor current $I_R(t)$ to decay, this taking place, for example, in a few milliseconds. The rotor current $I_R(t)$ is considered to have decayed when it reaches or falls below a predetermined switching threshold value. In the present case, the predetermined switching threshold value is 0 A, which is reached at time $t_2$ (see second graph 52).

Then, for example, the polarity of an input voltage at the rotor winding 14 is reversed. As a result, the rotor current $I_R(t)$ flows in the opposite direction (compared to the time interval between $t_0$ and $t_1$) and rises. The rotor current $I_R(t)$ of the rotor winding 14 is then limited as a function of a predetermined threshold value $I_L$ (see second graph 52). In particular, the rotor current is limited or regulated to a constant value or a value which is variable over time, in particular a value which is dependent on the rotation speed. In FIG. 6, the second graph 52 shows, starting from time $t_2$, that the rotor current $I_R(t)$ rises to −20 A after the polarity reversal (corresponds in particular to the predetermined threshold value $I_L$) and is limited there. For example, in the embodiment shown in FIG. 3A, the limiting is carried out by means of moving a fourth semiconductor component T4 (see FIGS. 3A, 3B, 3C, 5) and a fifth semiconductor component T5 (see FIGS. 3A, 3B, 3C, 5) alternately in synchronism with opposite senses to a conductive state and to a non-conductive state as a function of the predetermined threshold value $I_L$ for the rotor current $I_R(t)$.

After the polarity of the input voltage at the rotor winding 14 has been reversed (see above), the system waits, for example, for a predetermined period of time to elapse (time interval between $t_2$ and $t_3$). The predetermined period of time is, in particular, up to 2 ms or up to 3 ms. It should be noted that waiting for this period of time is not absolutely necessary. During this predetermined period of time, the first semiconductor component T1 (see FIGS. 2A, 2B, 2C, 3A, 3B, 3C, 4, 5) is preferably in a non-conductive state in the embodiment of FIGS. 2A, 2B and 2C, in the embodiment of FIGS. 3A, 3B and 3C, in the embodiment of FIG. 4 and in the embodiment of FIG. 5. After the predetermined period of time has elapsed, at time $t_3$, the stator current Is(t) through the stator winding 12 is increased as a function of the current rotation speed n(t) of the electric motor 7, in particular with a drop in the current rotation speed n(t). This occurs in the time interval between times $t_3$ and $t_4$ in the third graph 53 of FIG. 6. This advantageously results in an increase in the braking torque with which the rotor is braked.

In other words, for example in the first moment after the polarity reversal of the input voltage at the rotor winding 14 has been carried out, the first semiconductor component T1 remains in a non-conductive state. This results in the stator winding 12 remaining unenergized and therefore the stator current Is(t) is, because of the stator winding 12, not rising with the rotor current $I_R(t)$ which rises after the polarity reversal (see the interval between $t_2$ and $t_3$). After the predetermined period of time, which is up to 2 ms or up to 3 ms for example, has elapsed, the first semiconductor component T1 is moved to a conductive state. As a result, the stator winding 12 is energized and the stator current through the stator winding 12 can, for example, be increased in a controlled manner with a drop in the current rotation speed $n(t)$ of the electric motor 7 (see the time interval between times $t_3$ and $t_4$ in the third graph 53 of FIG. 6). Owing to this measure, the rotor current $I_R(t)$ and the stator current $I_s(t)$ of the electric motor 7 can be set independently of one another.

LIST OF REFERENCE SIGNS

1 Electric handheld power tool
2 Energy source
3 Tool fitting
4 Actuating circuit
5 Drilling tool
6 Connection unit
7 Electric motor
8 Connection unit
9 Handle
10 Nodes
11 Button
12 Stator winding
13 Line arrangement
14 Rotor winding
15 Connection terminal
16 Nodes
17 Plug
18 Nodes
19 Rectifier
20 Nodes
22 Nodes
51 Graph
52 Graph
53 Graph
100 Electric drive unit
A Arrow
B Arrow
$I_L$ Threshold value
$I_R(t)$ Rotor current
$I_s(t)$ Stator current
$n(t)$ Rotation speed
t Time
$t_0$ Time
$t_1$ Time
$t_2$ Time
$t_3$ Time
$t_4$ Time
T1 Semiconductor component
T1D Freewheeling diode
T2 Semiconductor component
T2D Freewheeling diode
T3 Semiconductor component
T3D Freewheeling diode
T4 Conductive component
T4D Freewheeling diode
T5 Semiconductor component
T5D Freewheeling diode
T6 Semiconductor component

What is claimed is:

1. An electric drive unit for an electric handheld power tool, the electric drive unit comprising:

an electric motor with a stator winding and a rotor winding;
an actuating circuit for actuating the electric motor; and
a connection unit for coupling an energy source for driving the electric motor,
the stator winding being connected via a first node to a stator-side first half-bridge including a first semiconductor component and a second semiconductor component and connected via a second node to the rotor winding,
the rotor winding being connected to a third node connected via a conductive component to the connection unit,
the actuating circuit including a third semiconductor component connected via the second node to the rotor winding and the stator winding and connected via a fourth node directly to the connection unit.

2. The electric drive unit as recited in claim 1 wherein the actuating circuit further comprises a further semiconductor component connected via the second node to the rotor winding and the stator winding and is connected via a fifth node directly to the connection unit.

3. The electric drive unit as recited in claim 1 wherein the actuating circuit is designed to move the first semiconductor component to a non-conductive state in order to interrupt a supply current flow.

4. The electric drive unit as recited in claim 1 wherein the actuating circuit is designed to move the third semiconductor component to a conductive state in order to connect the rotor winding in parallel with the stator winding.

5. The electric drive unit as recited in claim 1 further comprising a first current measuring unit for determining a current rotor current, wherein the actuating circuit is designed to move the first semiconductor component as a function of the determined current rotor current and a predetermined threshold value of the rotor current to a non-conductive state in order to limit the rotor current.

6. The electric drive unit as recited in claim 1 wherein the conductive component includes a fourth semiconductor component and the actuating circuit further comprises a fifth semiconductor component connected via the third node to the rotor winding and connected via a fifth node directly to the connection unit.

7. The electric drive unit as recited in claim 1 wherein the electric drive unit is designed for operation from a DC voltage source, a pulsating DC voltage source or an AC voltage source with a rectifier.

8. An electric handheld power tool comprising the electric drive unit as recited in claim 1.

9. The electric drive unit as recited in claim 4 wherein the actuating circuit is designed to move the first semiconductor component to a conductive state in addition to the third semiconductor component in order to provide a magnetic flux, so that a voltage is induced at the rotor winding in the opposite direction compared to a voltage applied to the rotor winding during motor operation of the electric motor.

10. The electric drive unit as recited in claim 6 wherein the actuating circuit is designed to move the fourth semiconductor component to a non-conductive state in order to interrupt a rotor current through the rotor winding.

11. The electric drive unit as recited in claim 6 wherein the drive circuit is designed to move the third semiconductor component and the fifth semiconductor component to a conductive state for reversing the polarity of an input voltage applied to the rotor winding compared to motor operation.

12. The electric drive unit as recited in claim 6 further comprising a first current measuring unit for determining a current rotor current, wherein the actuating circuit is designed to move the fifth semiconductor component and the fourth semiconductor component as a function of the determined current rotor current and a predetermined threshold value of the rotor current alternately in synchronism with opposite senses to a conductive state and to a non-conductive state in order to limit the rotor current.

13. The electric drive unit as recited in claim 6 further comprising a stator current measuring unit for determining a current stator current, wherein the actuating circuit is designed to move the first semiconductor component alternately to a conductive state and to a non-conductive state in order to regulate a stator current through the stator winding as a function of a current rotation speed of the electric motor.

14. The electric drive unit as recited in claim 11 wherein the actuating circuit is designed, after a predetermined period of time has elapsed after the third semiconductor component and the fifth semiconductor component have been moved to a conductive state, to move the first semiconductor component alternately to a conductive state and to a non-conductive state in order to regulate a stator current through the stator winding as a function of a current rotation speed of the electric motor.

15. The electric drive unit as recited in claim 12 wherein the actuating circuit is designed to move the fifth semiconductor component and the fourth semiconductor component as a function of the determined current rotor current, the predetermined threshold value of the rotor current and a current rotation speed of the electric motor alternately in synchronism with opposite senses to a conductive state and to a non-conductive state in order to limit the rotor current.

* * * * *